(12) United States Patent
Price et al.

(10) Patent No.: US 10,261,328 B2
(45) Date of Patent: Apr. 16, 2019

(54) ENHANCED ILLUMINATION SYSTEM

(71) Applicant: Microsoft Technology Licensing, LLC, Redmond, WA (US)

(72) Inventors: Raymond Kirk Price, Redmond, WA (US); Ravi Kiran Nalla, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 83 days.

(21) Appl. No.: 15/256,487

(22) Filed: Sep. 2, 2016

(65) Prior Publication Data
US 2018/0067324 A1   Mar. 8, 2018

(51) Int. Cl.
*G02B 27/01* (2006.01)
*F21V 5/00* (2018.01)
*F21V 5/04* (2006.01)
*F21V 7/00* (2006.01)
*H04N 5/225* (2006.01)

(52) U.S. Cl.
CPC .......... *G02B 27/0176* (2013.01); *F21V 5/002* (2013.01); *F21V 5/04* (2013.01); *F21V 7/0008* (2013.01); *G02B 27/017* (2013.01); *G02B 27/0172* (2013.01); *H04N 5/2256* (2013.01); *G02B 2027/0118* (2013.01); *G02B 2027/0138* (2013.01); *G02B 2027/0161* (2013.01); *G02B 2027/0178* (2013.01)

(58) Field of Classification Search
CPC . G02B 27/0176; G02B 27/0172; F21V 5/002; F21V 5/04; F21V 7/0008
USPC ........................................................ 362/237
See application file for complete search history.

(56) References Cited

U.S. PATENT DOCUMENTS 6,693,749 B2   2/2004   King et al.
7,230,766 B2   6/2007   Rogers
(Continued)

FOREIGN PATENT DOCUMENTS

EP   2071558 A1   6/2009

OTHER PUBLICATIONS

Rolland, et al., "Head-Mounted Display Systems", In Journal of Encyclopedia of Optical Engineering, Jul. 1, 2010, pp. 1-14.
(Continued)

*Primary Examiner* — Anh T Mai
*Assistant Examiner* — Meghan K Ulanday
(74) *Attorney, Agent, or Firm* — Newport IP, LLC; Scott Y. Shigeta

(57) ABSTRACT

An enhanced illumination system is provided. In some configurations, an illumination system comprises one or more illuminators for emitting light. Light steering optical elements direct the light along diverging axes. In some configurations, the camera module assembly can cause an output to be tilted down or tilted up relative to a horizontal plane. In some configurations, the illumination system comprises diffusers positioned to receive light along the diverging axes, each diffuser producing a field of illumination having a predetermined angle. The illumination system can be mounted on a computing device, such as an HMD providing a field of view to a camera, sensor, and/or a user. By the use of the techniques disclosed herein, an illumination system can mitigate optical loss that may be caused by a curved visor positioned between the illumination system and an object in the field of view.

26 Claims, 15 Drawing Sheets

(TOP VIEW)

(56) References Cited

U.S. PATENT DOCUMENTS

| | | |
|---|---|---|
| 7,542,209 B2 | 6/2009 | McGuire |
| 7,791,809 B2 | 9/2010 | Filipovich et al. |
| 8,511,827 B2 | 8/2013 | Hua et al. |
| 9,229,228 B2 | 1/2016 | Larson et al. |
| 2005/0140573 A1 | 6/2005 | Riser et al. |
| 2008/0043466 A1* | 2/2008 | Chakmakjian .......... F21V 5/007 362/237 |
| 2011/0170278 A1* | 7/2011 | Tordini .............. G02B 19/0095 362/84 |
| 2011/0221659 A1 | 9/2011 | King et al. |
| 2012/0075168 A1 | 3/2012 | Osterhout et al. |
| 2012/0081800 A1 | 4/2012 | Cheng et al. |
| 2012/0119978 A1 | 5/2012 | Border et al. |
| 2012/0162549 A1 | 6/2012 | Gao et al. |
| 2012/0294478 A1 | 11/2012 | Publicover et al. |
| 2013/0007668 A1 | 1/2013 | Liu et al. |
| 2013/0187836 A1 | 7/2013 | Cheng et al. |
| 2015/0062707 A1 | 3/2015 | Simmonds et al. |
| 2015/0160457 A1* | 6/2015 | Larson ............... G02B 27/0101 359/630 |

OTHER PUBLICATIONS

Cheng, et al., "Design of an Optical See-Through Head-Mounted Display with a Low f-Number and Large Field of view using a Freeform Prism", In Journal of Applied Optics, vol. 48, Issue 14, May 10, 2009, 3 pages.

"International Search Report and Written Opinion Issued in PCT Application No. PCT/US2017/048774", dated Oct. 20, 2017, 11 Pages.

* cited by examiner (TOP VIEW)

(TOP VIEW)

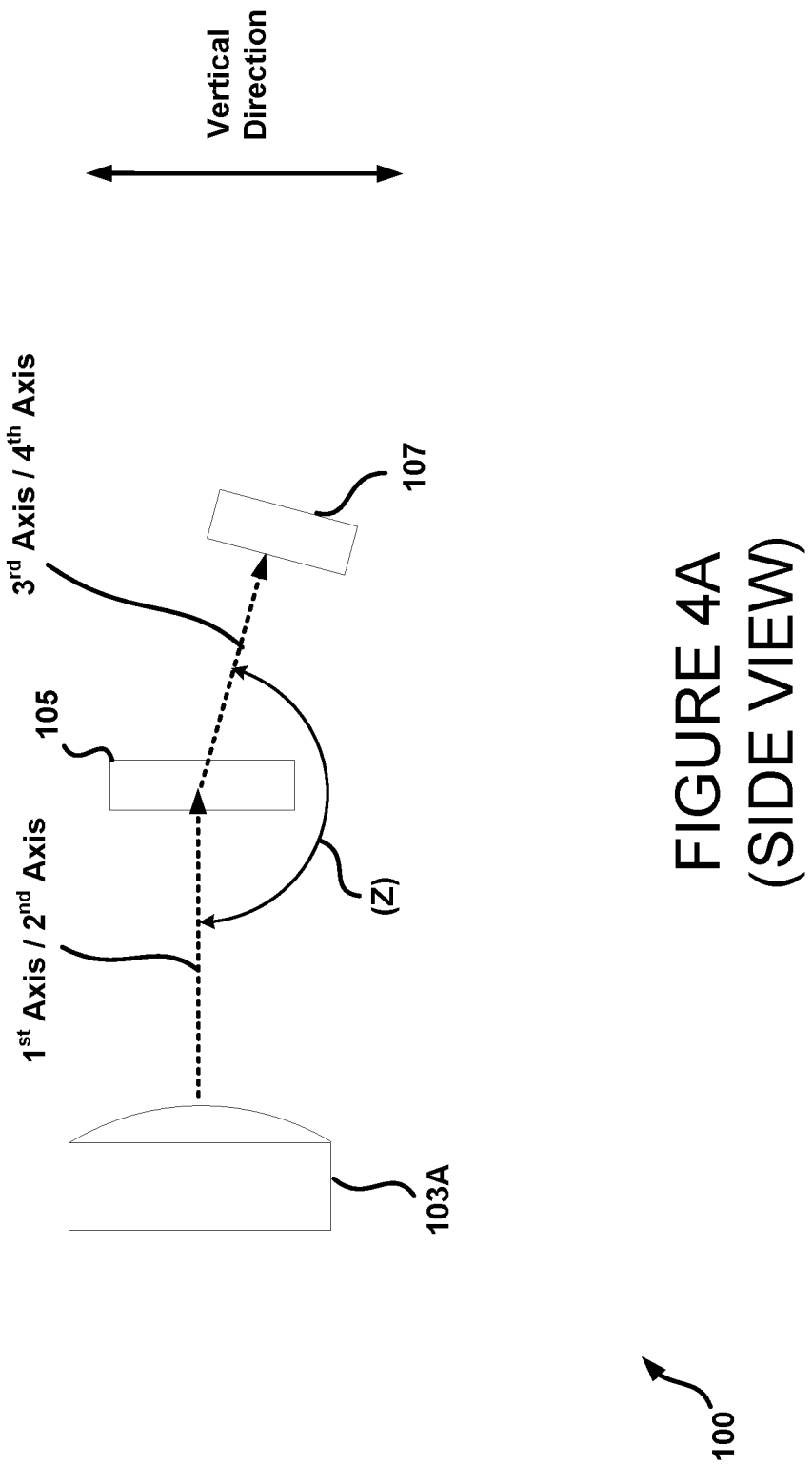

(SIDE VIEW)

(SIDE VIEW)

(SIDE VIEW)

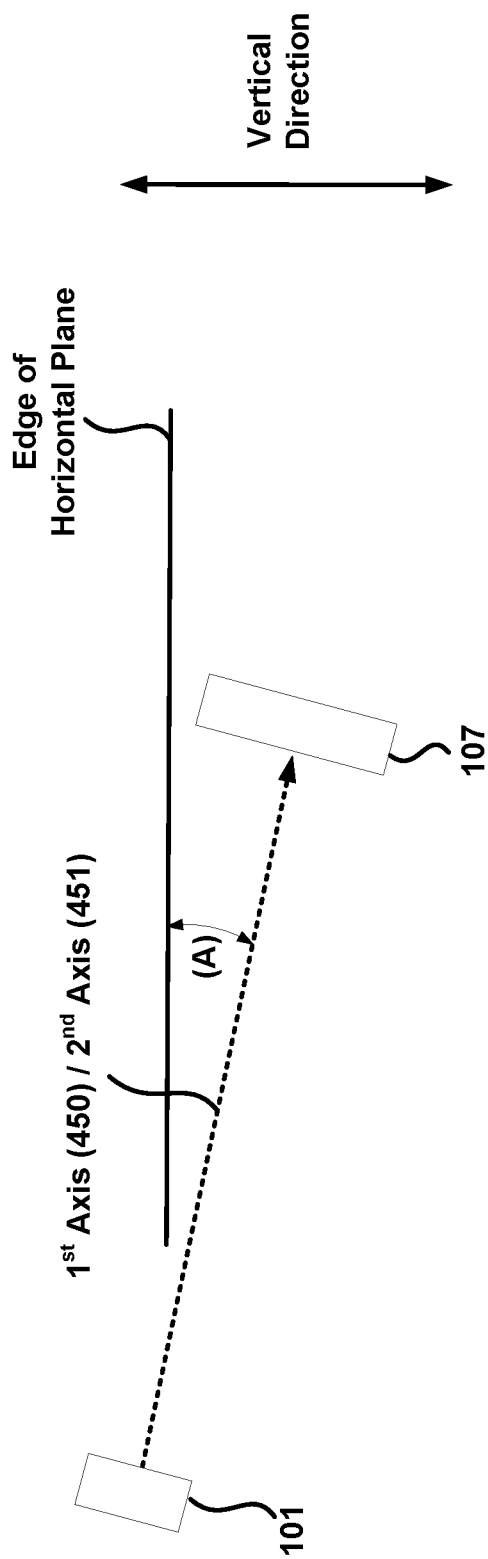

(SIDE VIEW)

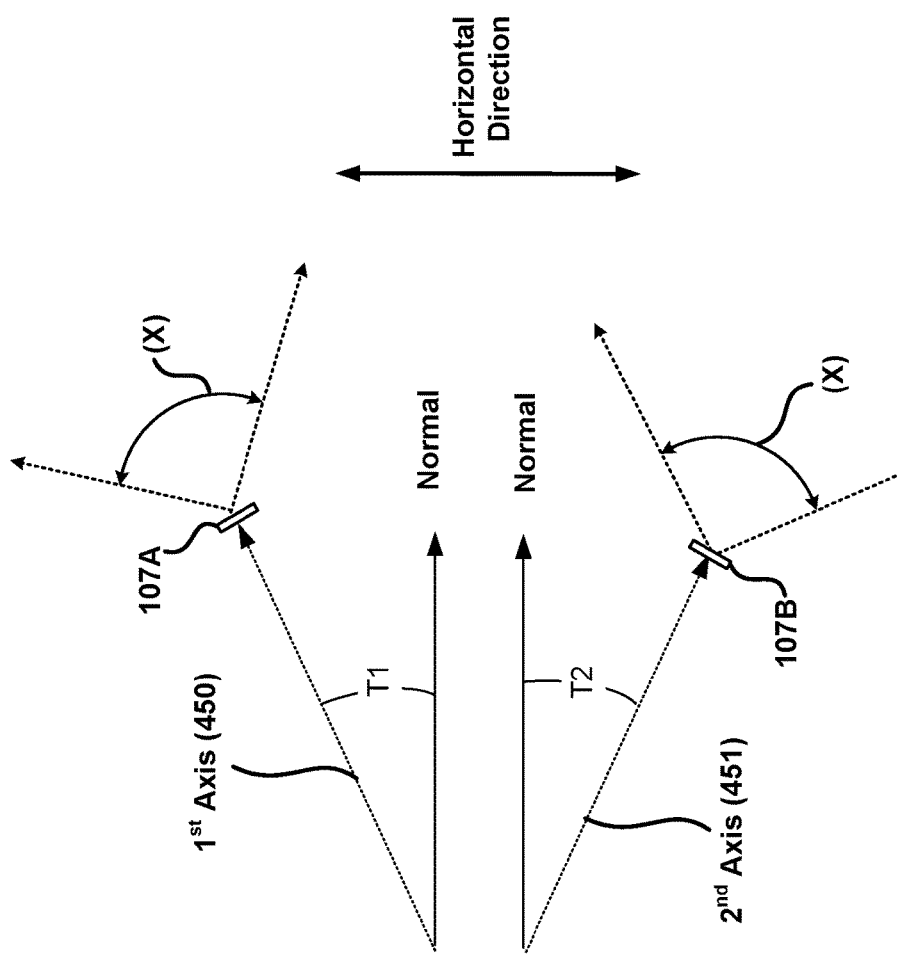

(Side View)

(Front View)

ENHANCED ILLUMINATION SYSTEM

BACKGROUND

Some computing devices, such as a head-mounted display (HMD), provide users with an immersive experience. For example, some HMDs are configured with a semi-transparent display positioned over a user's eyes. Such configurations, in conjunction with specialized software, can dynamically change a user's view depending on their head movement to create a virtual reality experience or an augmented reality experience.

Some HMDs include an input device, such as a camera or sensor, for capturing images of objects in a field of view. An HMD can also include one or more illuminators for enhancing a device's ability to capture images of the objects. Although illuminators can provide some benefit, some existing HMD designs may not be optimal for integrating illuminators into the system. For example, when an HMD includes a visor positioned in front of the illuminators, light emitted from the illuminators can suffer from optical loss as it passes through the visor. In some designs, the visor can distort light emitted from the illuminators. In some designs, the stray light from the illuminators can interfere with camera operation. A range of performance issues can arise when distorted light, e.g., light having a non-uniform distribution of light intensity, is directed to an object in the user's field of view. In some cases, a visor or any other type of protective shield can cause a high round-trip optical loss when the emitted light is reflected from the object back to the input device.

It is with respect to these and other considerations that the disclosure made herein is presented.

SUMMARY

Techniques and technologies are described herein for providing an enhanced illumination system. In some configurations, an illumination system comprises one or more illuminators configured to emit light. Light steering optical elements direct the light along diverging axes. In some configurations, the diverging axes can also be tilted down or tilted up with respect to a plane defining the horizon. In some configurations, the illumination system comprises diffusers positioned to receive light along the diverging axes, each diffuser producing a field of illumination having a predetermined angle. The illumination system can be mounted on any suitable device, such as an HMD providing a field of view to a camera, sensor, and/or a user. By the use of the techniques disclosed herein, an illumination system can mitigate optical loss that may be caused by a curved visor positioned between the illumination system, the imaging systems, and an object in the field of view.

In some configurations, an illumination system comprises one or more illuminators emitting light along a first axis and a second axis. The one or more illuminators can include a single light source and a beam splitter for receiving light from the light source and directing light along the first axis and the second axis. In some configurations, the one or more illuminators can include multiple light sources directing light along the first axis and the second axis.

The illumination system can comprise one or more light steering optical elements for causing the light of the first axis to propagate along a third axis, and causing the light of the second axis to propagate along a fourth axis. The light steering optical elements cause the third axis and the fourth axis to diverge in opposite directions. In some configurations, as will be described in more detail below, the illumination system comprises diffusers positioned to receive light along the third axis and the fourth axis. In some configurations, the light directed along the third axis and the fourth axis can also be tilted down or tilted up.

By the use of the techniques disclosed herein, an illumination system can mitigate optical loss that may be caused by a curved visor positioned in front of the illumination system, e.g., between the illumination system and an object in a user's field of view. As will be described in more detail below, by directing light in a manner described herein, an illumination system can mitigate optical loss caused by high angles of incidence. By directing light along two diverging axes that are, in some configurations, tilted down or tilted up, the two illumination profiles of the light along the diverging axes are coordinated to produce an output having an idealized annulus shape, even when the light is directed through a curved visor.

These and various other features will be apparent from a reading of the following Detailed Description and a review of the associated drawings. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. References made to individual items of a plurality of items can use a reference number with a letter of a sequence of letters to referring to individual items. Generic references to the items may use the specific reference number without the sequence of letters.

FIGS. 4A-4G illustrate side views of several example illumination systems providing a tilted output and a straight output.

DETAILED DESCRIPTION

Figure 1:
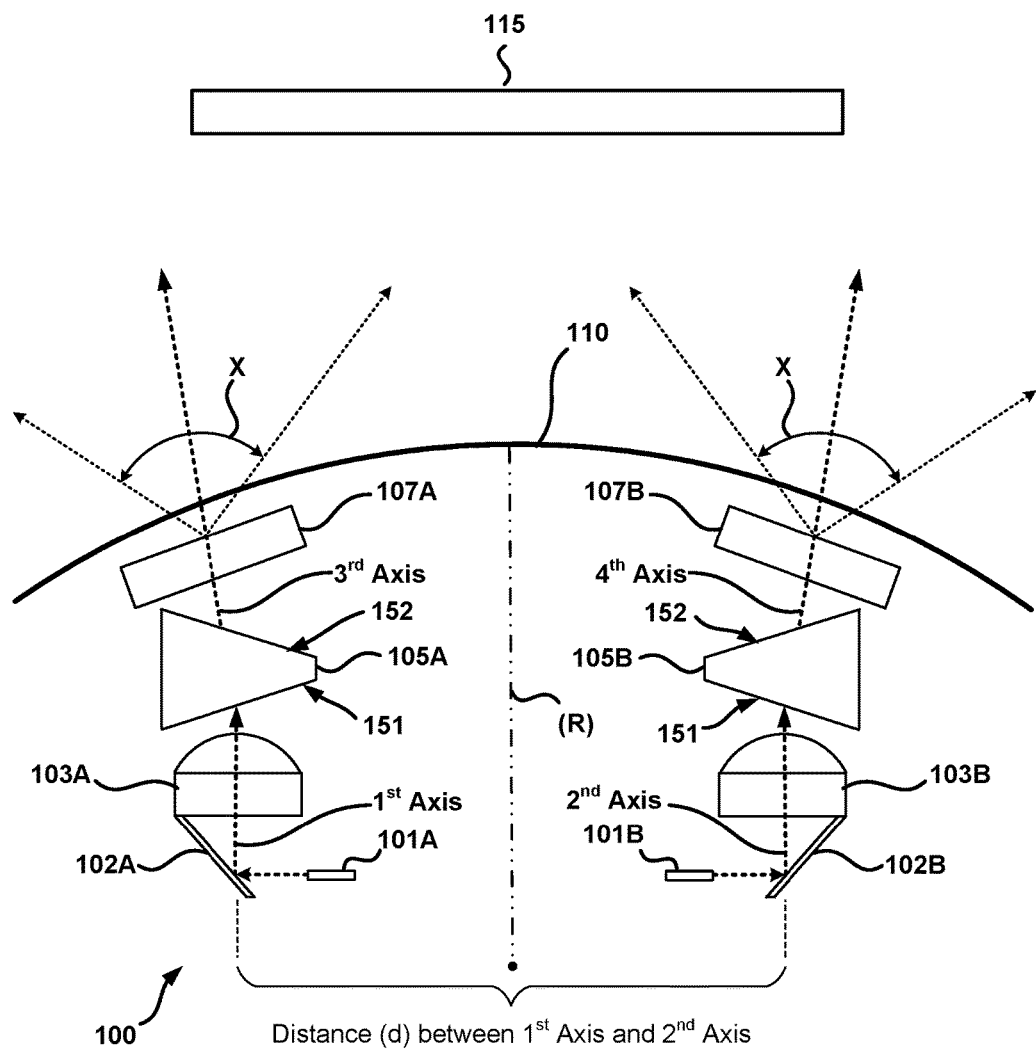
FIG. 1 is a top view of an illumination system configured according to the techniques disclosed herein.

With reference to FIG. 1, a top view of an example illumination system 100 is shown and described below. In this example, the illumination system 100 comprises a first illuminator 101A, a second illuminator 101B, a first reflecting device 102A, a second reflecting device 102B, a first collimator 103A, a second collimator 103B, a first light steering optical element 105A, a second light steering optical element 105B, a first diffuser 107A, and a second diffuser 107B. The illumination system 100 can mitigate optical loss that may be caused by a curved visor 110 positioned between the illumination system 100 and an object 115. By directing light along two diverging axes that are, in some configurations, tilted down, the two illumination profiles of the light of the diverging axes produce an output having an idealized annulus shape, even when directed through the visor 110. In some configurations, the illumination system 100 can mitigate optical loss caused by high angles of incidence.

In some configurations, the first illuminator 101A generates light (also referred to herein as a "first light") that is directed along a first axis. In some configurations, light generated by the first illuminator 101A can be directed along the first axis by the use of the first reflecting device 102A. The first collimator 103A receives the light generated by the first illuminator 101A to produce a first collimated light directed along the first axis.

In some configurations, the second illuminator 101B generates light (also referred to herein as a "second light") that is directed along a second axis. In some configurations, light generated by the second illuminator 101B can be directed along the second axis by the use of the second reflecting device 102B. The second collimator 103B receives the light generated by the second illuminator 101B to produce a second collimated light directed along the second axis.

The first illuminator 101A and the second illuminator 101B can include any suitable device for generating light having a desired wavelength. One example includes, but configurations are not limited to, a light emitting diode. Any suitable wavelength, such as wavelengths in the visible light spectrum or infrared spectrum, can be utilized by the techniques disclosed herein. The first reflecting device 102A and the second reflecting device 102B can include any suitable device for directing light along an axis. Examples include, but are not limited to, mirrors, prisms, or other suitable devices for steering or directing light. The first collimator 103A and the second collimator 103B can include any suitable device for collimating light. For example, a collimator can include a lens, mirror, as well as other diffractive optical elements or refractive lenses.

The first collimated light is directed to an input region 151 of the first light steering optical element 105A. The first light steering optical element 105A receives the first collimated light along the first axis and directs the first collimated light to propagate along a third axis from an output region 152. In addition, the second collimated light is directed to an input region 151 of the second light steering optical element 105B. The second light steering optical element 105B receives the second collimated light along the second axis and directs the second collimated light to propagate along a fourth axis from an output region 152.

The first light steering optical element 105A and the second light steering optical element 105B (collectively referred to herein as "light steering optical elements 105") can include any suitable device for steering or directing light. Examples include, but are not limited to, a wedged optic, tilted mirrors, offset collimating lenses, tilted reflectors, asymmetric diffusers, light pipes, fiber optics, dielectric waveguides, etc. In some configurations, a light steering optical element 105 comprises an input region 151 (also referred to as a "first surface 151") and an output region 152 (also referred to as a "second surface 152"). In some configurations, the input region 151 and the output region 152 define a wedge to steer light entering the input region 151 toward a predetermined axis through the output region 152.

In some configurations the third axis and the fourth axis are diverging axes. In one example, as shown in the top views of FIG. 1 and FIG. 2, the third axis and the fourth axis are diverging in opposite directions, e.g., the third axis and the fourth axis are canted out. As shown, light propagating along the third axis is canted out toward the left, and light propagating along the fourth axis is canted out toward the right.

Figure 2:
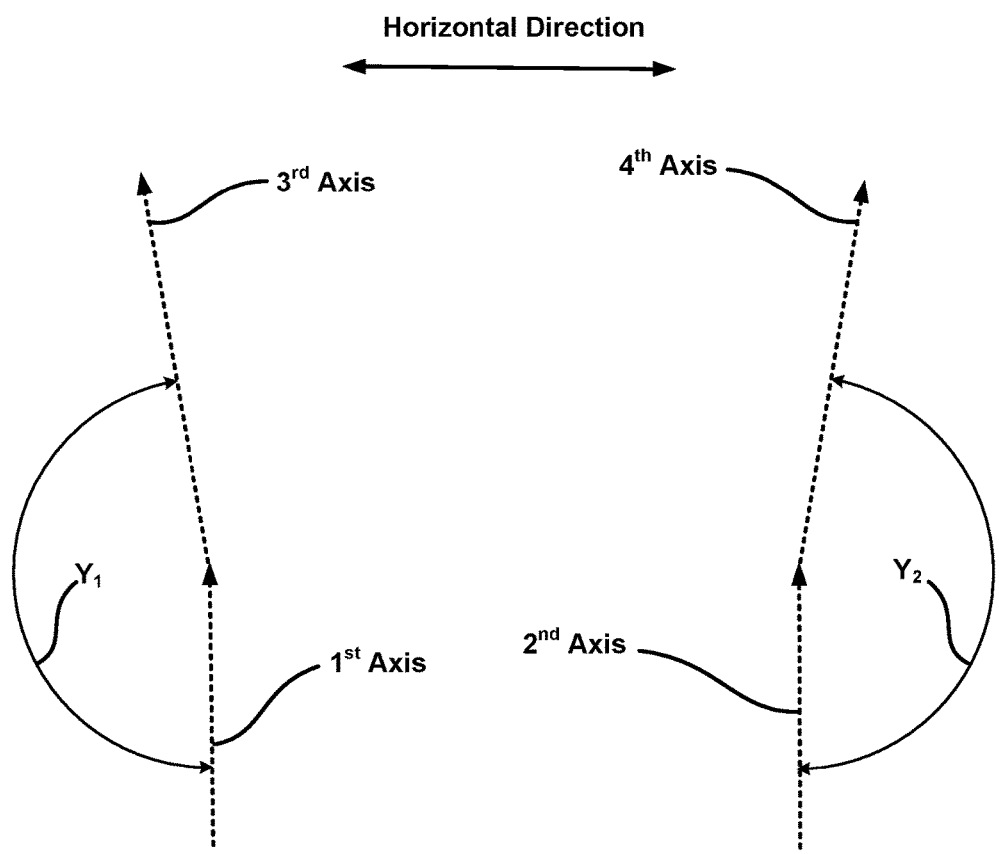
FIG. 2 is an illustration showing a top view of relative angles between various axes shown in FIG. 1.

As shown in FIG. 2, the divergence between the third axis and the fourth axis can be measured by included angles. In some configurations, a first included angle (Y1) between the first axis and the third axis can be within a predetermined range. Similarly, a second included angle (Y2) between the second axis and the fourth axis can be within a predetermined range. In some configurations, the first included angle (Y1) and the second included angle (Y2) can be obtuse angles.

The first included angle (Y1) and the second included angle (Y2), both of which are collectively and generically referred to herein as "included angles (Y)," can be based on one or more factors. For instance, the included angles (Y) can be based, at least in part, on the radius of curvature (R) of the visor 110. In some configurations, the included angles (Y) can be based, at least in part, on the distance (d) between the first axis and the second axis. In addition, the included angles (Y) can be based, at least in part, on the height of the illuminators 101 relative to the camera lens, where a height (h) can be a vertical distance between a center axis of the illuminator relative to a center axis to a camera. In some configurations, the included angles (Y) can be based on the radius (R) of curvature of the visor 110, the distance (d) between the first axis and the second axis, and/or the height of the illuminators. The individual factors can contribute individually or collectively.

In some configurations, the first included angle (Y1) can be within a range of 165 degrees and 175 degrees, and the second included angle (Y2) can be within the range of 165 degrees and 175 degrees. Configurations utilizing such parameters can include a visor 110 having a radius of curvature within 130 mm and 150 mm. In such an example, the distance (d) between the first axis and the second axis can be within 59 mm and 65 mm. The height of the illuminators 101 can be between 5 mm and 8 mm. The visor 110 can be positioned at a predetermined distance from the diffusers 107. In one illustrative example, although other values can be used, the first diffuser 107A and the second diffuser 107B can be positioned at a distance of 1 mm from the visor 110. In some configurations, the first diffuser 107A and the second diffuser 107B can be positioned butted up to the visor 110.

In one illustrative example, the radius of curvature of the visor 110 can be 140 mm, the distance (d) between the first axis and the second axis can be within the range of 60-63 mm, the first included angle (Y1) can be 170 degrees, and the second included angle (Y2) can be 170 degrees. In such a configuration, the height of the illuminators can be 6 mm to 7 mm. These examples are provided for illustrative purposes and are not to be construed as limiting. It can be appreciated that each light steering optical element 105 can be configured to produce suitable included angles (Y) for causing light of the diverging axes to produce an output having an idealized annulus shape. In addition, each light steering optical element 105 can be configured to produce suitable included angles (Y) for reducing an angle of incidence with respect to light bearing on the visor 110.

In some configurations, the first diffuser 107A can be positioned to receive the collimated light along the third axis, and the second diffuser 107B can be positioned to receive the collimated light along the fourth axis. The individual diffusers 107 are configured to receive light and produce a field of illumination having a predetermined angle (X). In one illustrative example, the predetermined angle (X) can be in a range between 90 degrees and 125 degrees. In some configurations, the predetermined angle (X) can be between 95 degrees and 105 degrees or between 115 degrees and 125 degrees. In two illustrative examples, the predetermined angle (X) can be 100 degrees or 120 degrees. These examples are provided for illustrative purposes. Other suitable values for the predetermined angle (X) can be utilized for causing the light of the diverging axes to produce an output having an idealized annulus shape.

The example illumination system 100 shown in FIG. 1 is provided for illustrative purposes and is not to be construed as limiting. It can be appreciated that the illumination system 100 can include any suitable number of components, some variations of which are disclosed herein. For instance, the use of the first reflecting device 102A and the second reflecting device 102B is optional as light generated by the first illuminator 101A and light generated by the second illuminator 101B can be directed, respectively, along the first axis and the second axis. In another example, as will be described in more detail below, instead of utilizing multiple illuminators 101, a single light source can also be used in conjunction with a beam splitter to direct light along the first axis and second axis.

In some configurations, the light directed along the diverging axes can be tilted down. Such configurations can be used to further mitigate optical loss caused by high angles of incidence. To illustrate aspects of such configurations, FIG. 3 shows a perspective view of relative angles between various axes.

Figure 3:
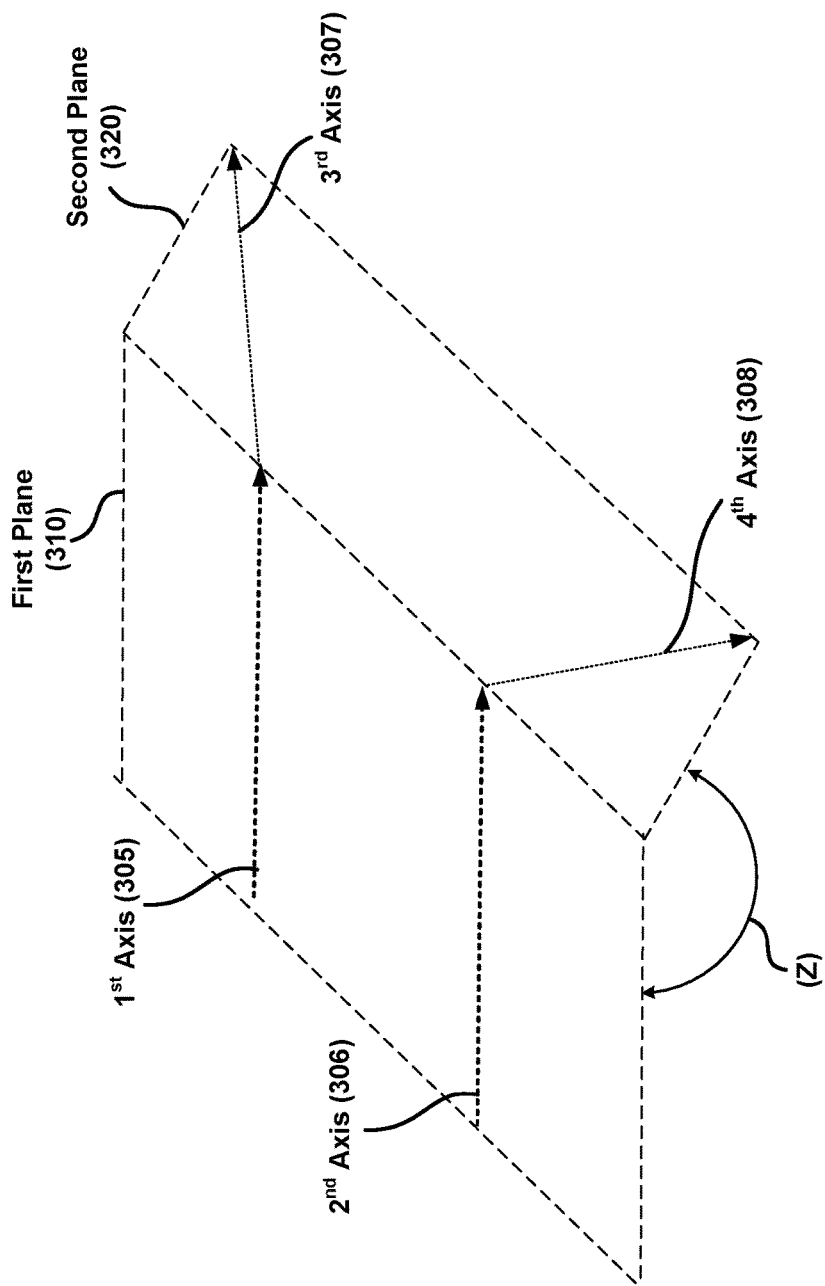
FIG. 3 is an illustration showing a perspective view of relative angles between various axes shown in FIG. 1.

As shown in FIG. 3, the first axis 305 and the second axis 306 can define a first plane 310, and the third axis 307 and the fourth axis 308 can define a second plane 320. The tilt can be measured by a third included angle (Z) between the first plane 310 and the second plane 320. In some configurations, the third included angle (Z) can be within a predetermined range. In some configurations, the third included angle (Z) can be an obtuse angle.

The third included angle (Z) can be based on one or more factors. For instance, the third included angle (Z) can be based, at least in part, on the radius of curvature (R) of the visor 110. In some configurations, the third included angle (Z) can be based, at least in part, on the distance (d) between the first axis and the second axis. In addition, the third included angle (Z) can be based, at least in part, on the height of the illuminators 101. In some configurations, the third included angle (Z) can be based on the radius (R) of curvature of the visor 110, the distance (d) between the first axis and the second axis, and/or the height of the illuminators. The individual factors can contribute individually or collectively.

In some configurations, the third included angle (Z) can be in the range of 140 to 144 degrees. Configurations utilizing such a range can include a visor 110 having a radius of curvature within 130 mm and 150 mm. In such an example, the distance (d) between the first axis and the second axis can be within 59 mm and 65 mm. The height of the illuminators 101 can be between 5 mm and 8 mm. The visor 110 can be positioned at a predetermined distance from the diffusers 107. In one illustrative example, the first diffuser 107A and the second diffuser 107B can be positioned at a distance of 1 mm from the visor 110. Such configurations can be utilized with suitable values for the first included angle (Y1) and the second included angle (Y2).

In one illustrative example, the radius of curvature of the visor 110 is 140 mm, the distance (d) between the first axis and the second axis is within the range of 60-63 mm, and the third included angle (Z) is 142 degrees. In such a configuration, the height of the illuminators can be 6 mm to 7 mm. Such a configuration can be utilized with suitable values for the first included angle (Y1) and the second included angle (Y2).

These examples are provided for illustrative purposes and are not to be construed as limiting. It can be appreciated that each light steering optical element 105 can be configured to steer light along the third axis and the fourth axis and also tilt the light along the third axis and the fourth axis within a range of suitable angles. Any suitable value for the first included angle (Y1), the second included angle (Y2), and third included angle (Z) can be utilized for reducing an angle of incidence with respect to light bearing on the visor 110. The examples disclosed herein mitigate optical loss by reducing the angle of incidence with respect to light bearing on the visor 110.

For illustrative purposes, light steered at a first included angle (Y1) and/or a second included angle (Y2) means that light is steered in a horizontal direction. Light that is steered at a third included angle (Z) means that light is steered in a vertical direction. For illustrative purposes, the terms "normal," "horizontal," "horizon," and "vertical" refer to vectors, directions and/or planes relative to one or more components of the system 100 or a device. For example, a horizontal plane, a horizontal direction, a vertical plane or a vertical direction can be defined by the first axis and the second axis, an alignment with respect to one or more components, such as a camera, sensor, lens, diffuser, or any other component or group of components. Normal can be a direction or vector that is relative to a sensor of a camera, a lens, a surface of a circuit board, etc. Normal can be parallel to a horizontal plane. The terms "horizontal" and "vertical" are utilized herein independent of the direction of gravity.

FIG. 4A illustrates a side view of an illumination system 100 where the steering optical elements 105 are used to tilt the light propagating along the third axis and the fourth axis. In this configuration, in addition to causing the light to diverge in opposite directions as shown in FIG. 1 and FIG. 2, the first light steering optical element 105A and the second light steering optical element 105B cause the light of the third axis and the fourth axis to tilt. As shown in FIG. 4A, the tilt can be measured by the third included angle (Z), which can be obtuse. In such configurations, the light is directed in a horizontal direction, e.g., light along the third axis is diverging from light along the fourth axis, as well as a vertical direction, e.g., tilted down.

Figure 4B:
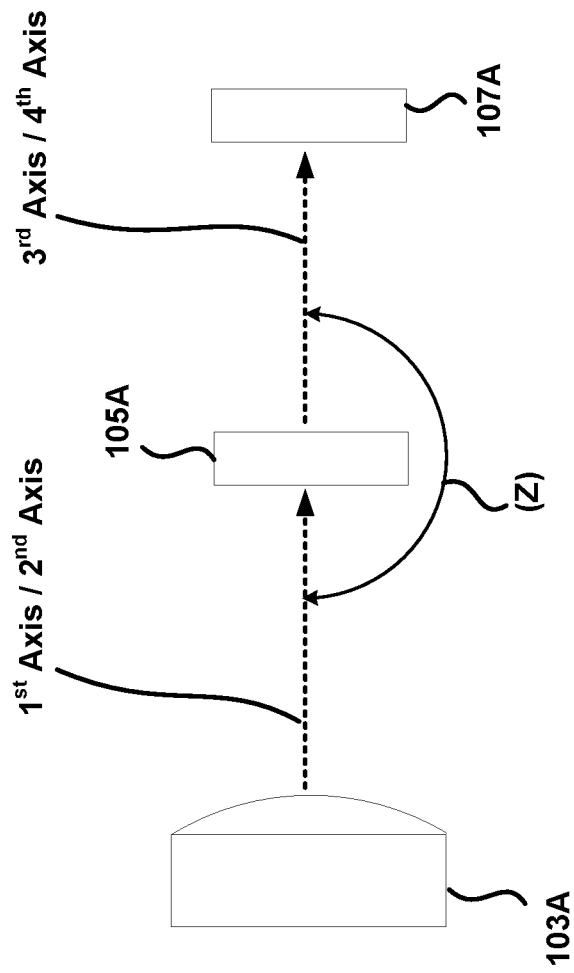

FIG. 4B illustrates a side view of another example illumination system 100 where the steering optical elements 105 are used to direct light propagating along the third axis and the fourth axis. In this example, the third included angle (Z) is 180 degrees. In such configurations, the light is directed in a horizontal direction, e.g., light along the third axis is diverging from light along the fourth axis, but the light is not tilted in a vertical direction.

Figure 4C:
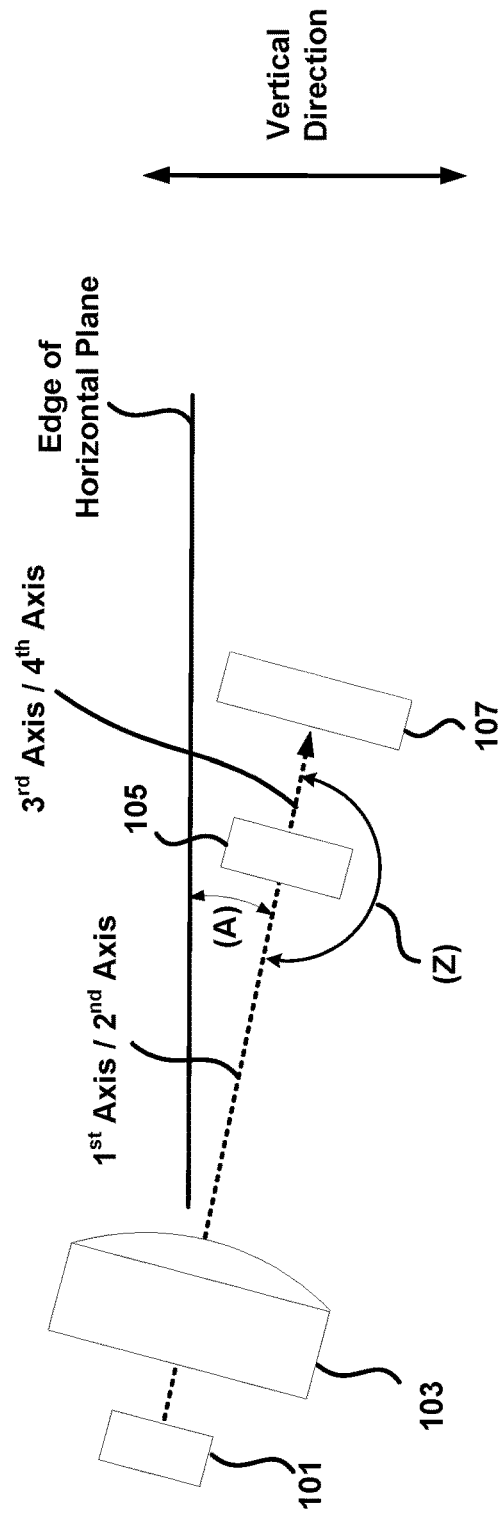

FIG. 4C illustrates a side view of yet another configuration of an illumination system 100. In this example, the first axis and the second axis are tilted down. The light propagating along the first axis and the second axis can be directed by one or more illuminators 101 and/or reflecting devices 102. The first axis and the second axis can be tilted down from a horizontal plane by a predetermined angle (A), also referred to herein as a "tilt angle (A)." In some configurations, the predetermined angle (A) can be in the range of 36 degrees to 40 degrees. The predetermined angle (A) can also be in the range of −40 degrees to 40 degrees, e.g., tilting up or down from the horizon. In one illustrative example, the predetermined angle (A) can be 38 degrees. Such configurations can be utilized with the parameters, e.g., radius (R) of curvature of the visor 110, the distance (d) between the first axis and the second axis, and/or the height of the illuminators, in the above-described examples. These examples are not to be construed as limiting, configurations can include other tilt angle (A) that may be needed to reduce an angle of incidence with respect to light bearing on the visor 110.

Figure 4D:
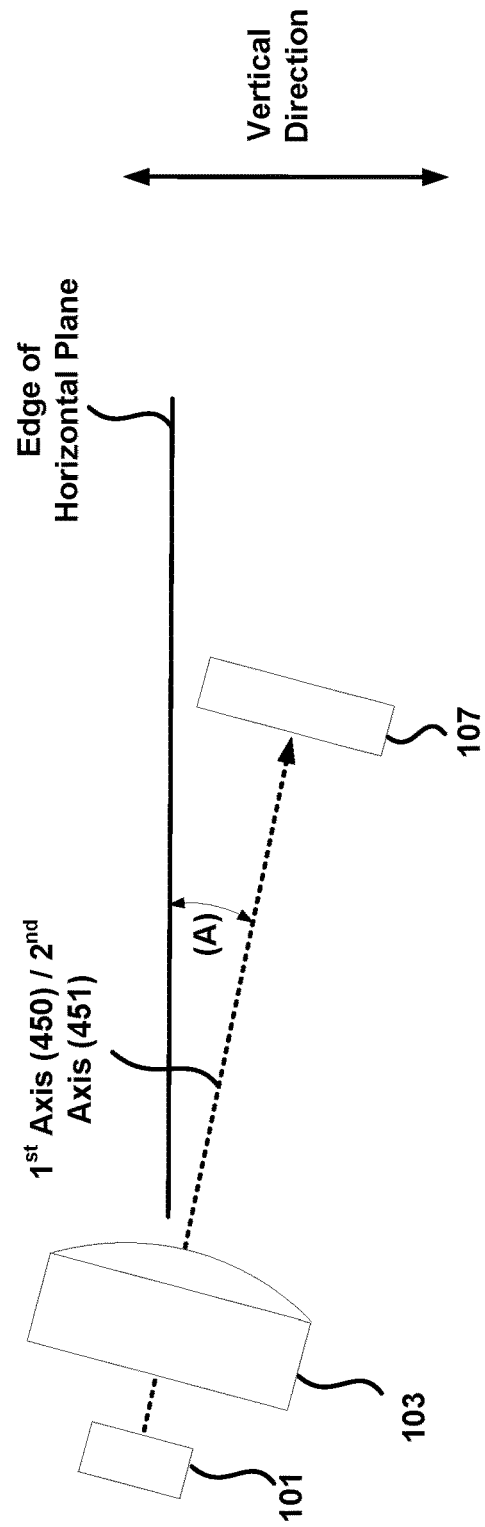

FIG. 4D illustrates a side view of yet another configuration of an illumination system 100. Similar to the example of FIG. 4C, the first axis and the second axis are tilted down. The light propagating along the first axis and the second axis can be directed by one or more illuminators 101 and/or reflecting devices 102 held in position by a bracket or a flexible material suitable for holding one or more components in position. The first axis and the second axis can be tilted down or up with respect to a horizontal plane by a predetermined angle (A), which can be from −40 degrees to 40 degrees. In this configuration, the light propagating along the first axis and the second axis is directed to the diffusers 107 without the use of light steering elements.

FIG. 4E illustrates a side view of yet another configuration of an illumination system 100. Similar to the example of FIGS. 4C and 4D, the first axis and the second axis are tilted down. The light propagating along the first axis and the second axis can be directed by one or more illuminators 101 and/or reflecting devices 102 held in position by a bracket or a flexible material suitable for holding one or more components in position. The first axis and the second axis can be tilted down for up with respect to a horizontal plane by a predetermined angle (A), which can be from −40 degrees to 40 degrees. In this configuration, the light propagating along the first axis and the second axis is directed to the diffusers 107 without the use of the light steering elements or the collimators.

Figure 4F:
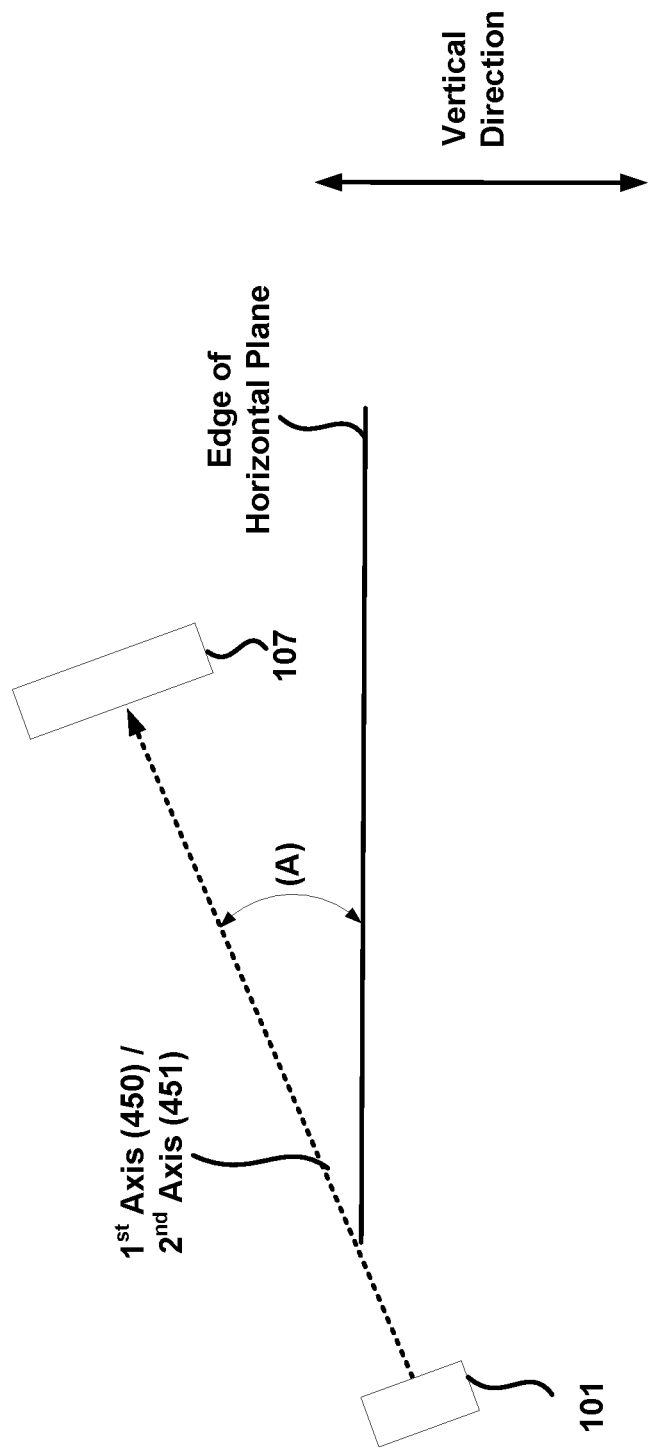

FIG. 4F illustrates a side view of the configuration shown in FIG. 4E. This example is provided to illustrate that configurations disclosed herein can be used to tilt the light above a horizontal plane by a predetermined angle (A), or a predetermined included angle (Z). Of the examples provided herein, it can be appreciated that the components of an illumination system 100 can be held in position by any suitable material, which may be in the form of a housing, bracket, or a flexible member of sufficient strength to hold the components in position to maintain the angles prescribed herein.

FIG. 4G illustrates a top view of relative angles between various axes shown in FIGS. 4D-4F. In such configurations, light emitted from one or more illuminators 101 is directed along a first axis and a second axis. The light can be directed using a number of different techniques and components. For instance, light pipes and/or fiber optics can be used to direct light along the first axis and the second axis. In some configurations, a bracket can be utilized to hold one or more illuminators 101 and a pair of diffusers 107 to produce the output described herein.

As shown in FIG. 4G, the first axis and second axis are diverging. The first axis is diverging from a normal by a first predetermined angle (T1) and the second axis is diverging from the normal by a second predetermined angle (T2). The first predetermined angle (T1) can be in a range of 0 degrees to 40 degrees. The second predetermined angle (T2) can be in a range of 0 degrees to 40 degrees. The collective angle of divergence between the first axis 450 and second axis 451 can be 0 degrees to 40 degrees. In one illustrative example, the collective angle of divergence between the first axis 450 and second axis 451 can be 0 degrees to 80 degrees.

Figure 5:
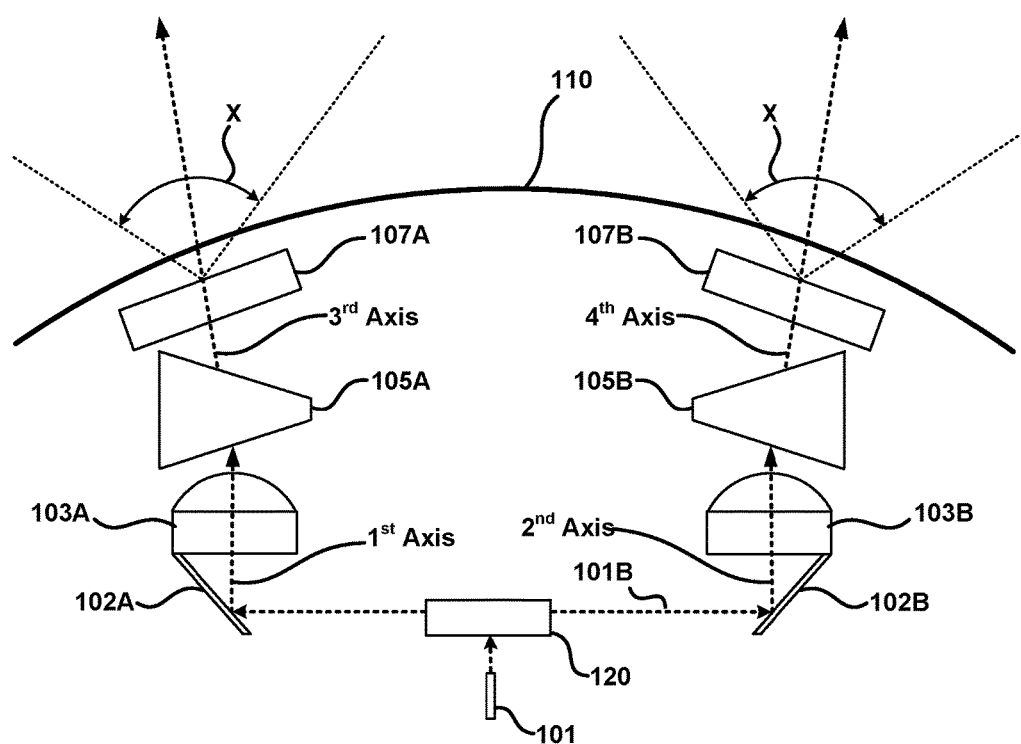
FIG. 5 is a top view of another example illumination system configured with a single illuminator and a beam splitter.

FIG. 5 illustrates a top view of yet another configuration of an illumination system 100. In this example, the illumination system 100 comprises a light source and a beam splitter 120 for directing light toward the first reflecting device 102A and the second reflecting device 102B. In turn, the first reflecting device 102A and the second reflecting device 102B direct light along the first axis and the second axis toward the collimators 105. These examples are provided for illustrative purposes and are not to be construed as limiting. It can be appreciated that other arrangements for generating light can be utilized by the techniques disclosed herein. Other variations may apply, for instance, the beam splitter 120 can also direct the light along the first axis and the second axis without the use of the reflecting devices 102.

Figure 6:
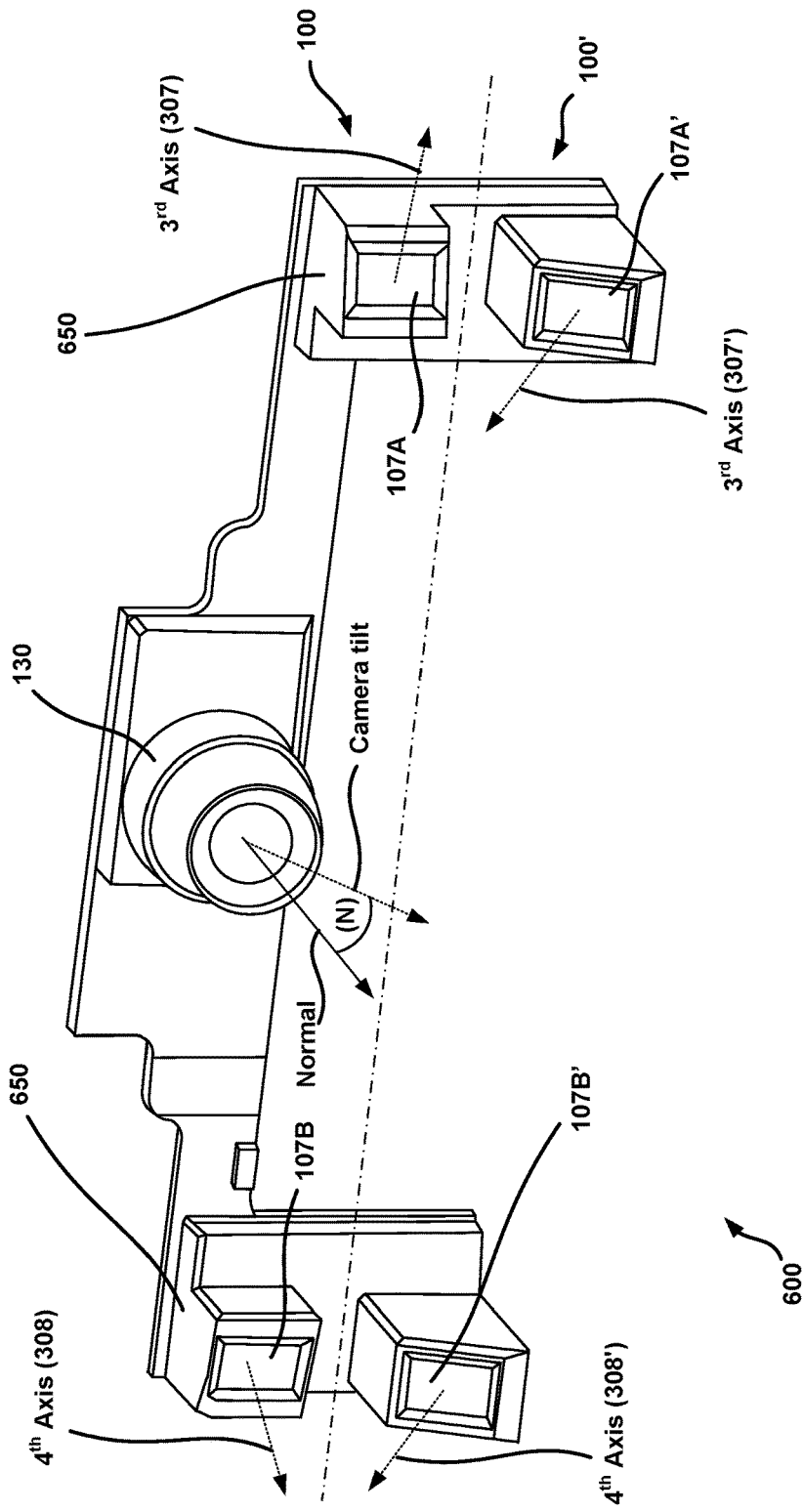
FIG. 6 is a top view of a camera system having multiple illumination modules.

FIG. 6 is a top view of a device 600 having a pair of illumination systems and a camera 130. In this example, the device 600 comprises a first illumination system 100 positioned on top of a second illumination system 100'. The first illumination system 100 (referred to herein as the top illumination system 100) comprises a first diffuser 107A and a second diffuser 107B arranged to receive light from at least one illuminator as described herein. The first illumination system 100, which can also include an illuminator, collimator and a steering element, can be held in position by a bracket 650. The second illumination system 100' (referred to herein as the bottom illumination system 100') comprises a first diffuser 107A' and a second diffuser 107B' arranged to receive light from at least one illuminator as described herein. The second illumination system 100', which can also include an illuminator, collimator, and a steering element, can be held in position by the bracket 650. For illustrative purposes, FIG. 6 includes a dashed line showing the separation of the first illumination system 100 (positioned above the dashed line) and the second illumination system 100' (positioned below the dashed line).

Each illumination system can be configured and arranged to emit light in a range of predetermined directions. For instance, with respect to the top illumination system 100', light can be directed along the third axis 307 and the fourth axis 308, wherein the third axis 307 and the fourth axis 308 are diverging axes. The first included angle (Y1) and the second included angle (Y2) can be equal or different angles, and each included angle (Y) can be within a range of 140 degrees to 179 degrees. In some configurations, included angles (Y) can each be 180 degrees. The tilt angle (A) can be within a range of −40 degrees to 40 degrees, e.g., 40 degrees up from a horizon or 40 degrees down from a horizon, or the third included angle (Z) (as illustrated in FIG. 4A) can be within a range of 140 to 220 degrees.

In addition, with respect to the bottom illumination system 100', light can be directed along the third axis 307' and the fourth axis 308'. In such an embodiment, the included angles for the third axis 307' and the fourth axis 308' can be 140 to 180 degrees. The third included angle (Y1) and the second included angle (Y2) can be equal or different angles. The first included angle (Y1) and the second included angle (Y2) can be equal or different angles, and each included angle (Y) can be within a range of 140 degrees to 179 degrees. In some configurations, the first included angle (Y1) can be 180 degrees and the second included angle (Y) can be 180 degrees. The tilt angle (A) can be within a range of −40 degrees to 40 degrees, or the third included angle (Z) can be within a range of 140 to 220 degrees. In one illustrative example, for the bottom illumination system 100', the first included angle (Y1) is 180 degrees, the second included angle (Y) is 180 degrees, and the third included angle (Z) is 220 degrees, e.g., tilted up 40 degrees from a horizontal plane.

These are examples are provided for illustrative purposes and are not to be construed as limiting. It can be appreciated that the illumination systems can be configured to propagate light along axes directed in various directions, some configurations of which may not be symmetric, e.g., the light on one side may be directed upward while light on another side may be directed forward or in a downward direction relative to a horizon.

In addition, the device 600 can also comprise a camera 130 having a predetermined tilt angle (N). For instance, the camera can be in line with a horizontal plane (normal), tilted down, or tilted up. In one specific example, the camera can be tilted up from normal 1 degree to 40 degrees or tilted down from normal 1 degree to 40 degrees.

Figure 7:
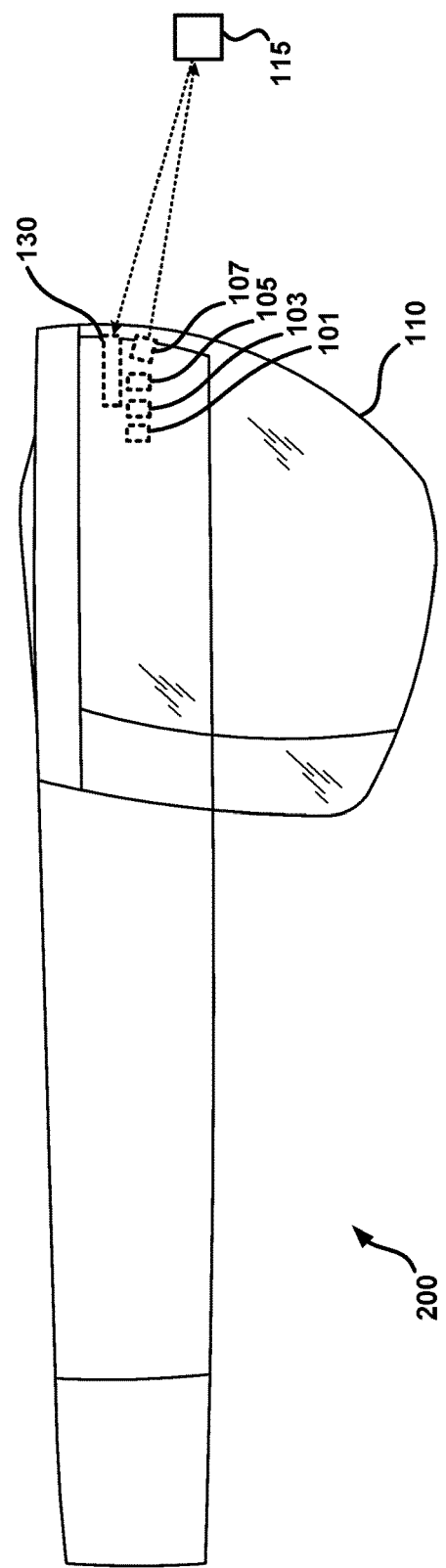
FIG. 7 is a side view of an example computing device comprising an illumination system configured according to the techniques disclosed herein.

FIG. 7 illustrates a side view of an example computing device 200 comprising an illumination system 100 configured according to the techniques disclosed herein. In this example, the computing device 200 is a HMD comprising a camera 130. The side view of FIG. 7 shows example positions for the illuminators 101, collimators 103, light steering optical elements 105, and diffusers 107. As shown, light emitted from the diffusers 107 can pass through the visor 110. The light then reflects from an object 115 positioned in front of the computing device 200 and returns to the camera 130. The described values for the first included angle, the second included angle and the third included angle can mitigate optical loss caused by reducing the angle of incidence with respect to the visor 110.

Figure 8:
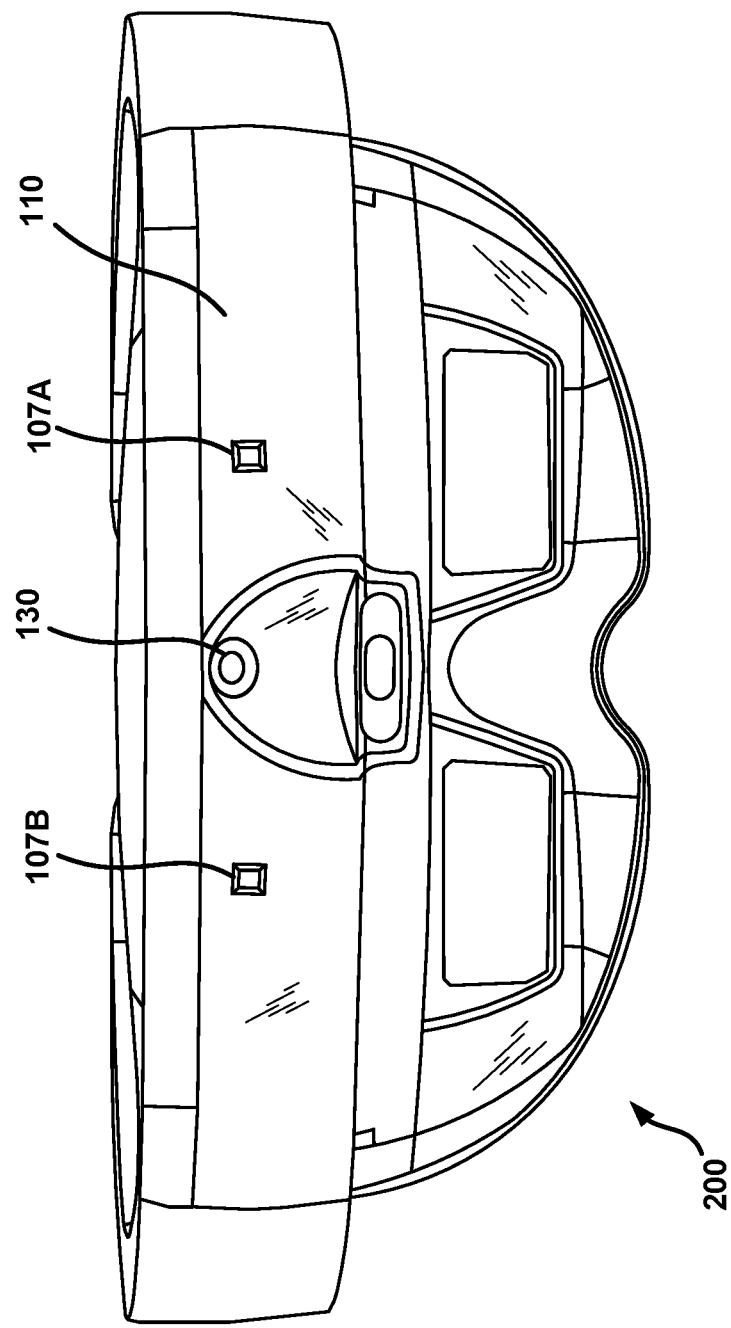
FIG. 8 is a front view of the example computing device shown in FIG. 7.

FIG. 8 is a front view of the example computing device 200 shown in FIG. 7. The front view of FIG. 8 shows example positions for the first diffuser 107A, the second diffuser 107B and the camera 130. As shown, the visor 110 can be positioned in front of the first diffuser 107A, the second diffuser 107B and the camera 130. This example is provided for illustrative purposes and is not to be construed as limiting. It can be appreciated that the components shown herein can be in different positions and it can be appreciated that configurations disclosed herein can be utilized by other types of devices other than an HMD. For instance, the illumination system 100 disclosed herein can be a stand-alone system, part of an imaging system, or any device having protective shield positioned in front of one or more illumination output components.

Figure 9:
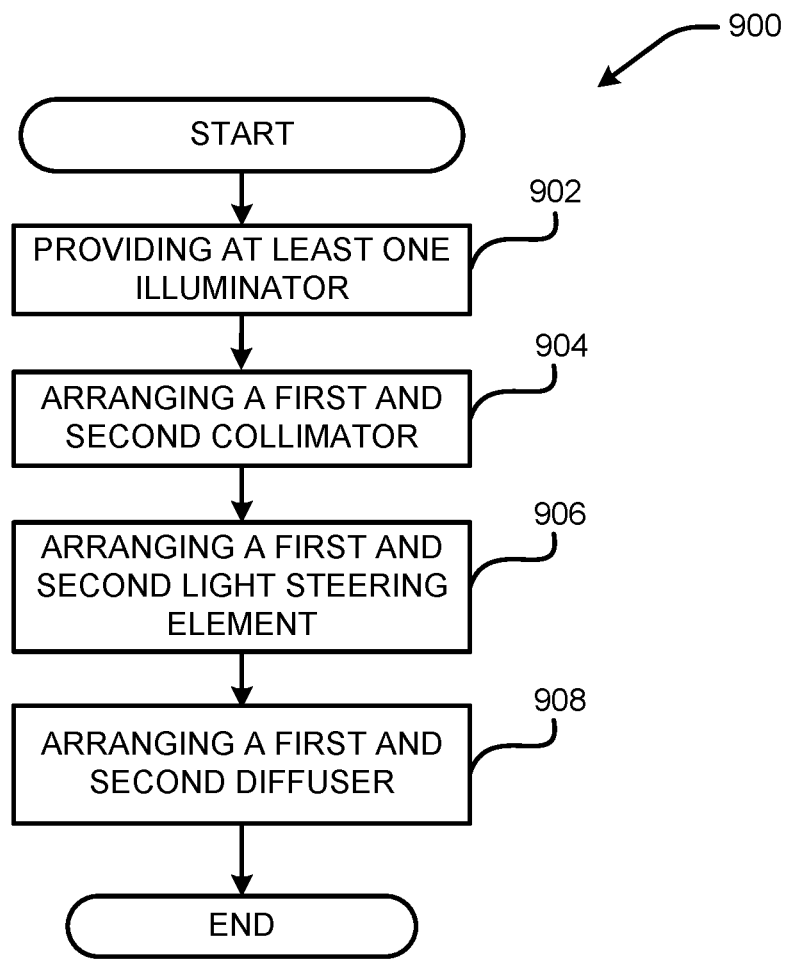
FIG. 9 illustrates some aspects of an example processes for producing an illumination system.

Referring now to FIG. 9, aspects of an example process 900 for producing an illumination system 100 are shown and described below. It should be understood that the stages of the processes are not necessarily presented in any particular order and that performance of some or all of the stages in an alternative order(s) is possible and is contemplated. The stages have been presented in the demonstrated order for ease of description and illustration. Stages can be added, omitted, and/or performed simultaneously, without departing from the scope of the appended claims. It also should be understood that the illustrated processes can end at any time and need not be performed in its entirety.

The process 900 starts at block 902 where at least one illuminator configured to emit light is provided. One example includes, but configurations are not limited to, a light emitting diode. Any illuminator configured to produce an output having a suitable wavelength, such as wavelengths in the visible light spectrum or infrared spectrum, can be utilized by the techniques disclosed herein.

Next, at block 904, a first collimator and a second collimator are arranged. The first and second collimator are arranged to receive the light from the illuminator. As summarized above, the collimators are configured to collimate the light to produce a first and a second collimated light directed along a first axis and a second axis.

Next, at block 906, a first light steering optical element and a second light steering optical element are arranged. As summarized above, the first light steering optical element is arranged to receive the first collimated light. In addition, the first light steering optical element causes the first collimated light to propagate along a third axis. The second light steering optical element is arranged to receive the second collimated light. In addition, the second light steering optical element causes the second collimated light to propagate along a fourth axis. The third axis and the fourth axis are arranged to be diverging axes. The degree of divergence and the tilt can be based on a number of factors, as described herein.

Next, at stage block 908, a first diffuser and a second diffuser are arranged. The first diffuser is arranged to receive the first collimated light along the third axis. In addition, the first diffuser is configured to produce a first field of illumination from the first collimated light. The second diffuser is arranged to receive the second collimated light along the fourth axis. The second diffuser is also configured to produce a second field of illumination from the second collimated light. By the use of the techniques disclosed herein, the illumination profile created by the first diffuser and the illumination profile created by the second diffuser produce an output having an idealized annulus shape.

The above-disclosure can be supplemented by the following clauses:

Clause A: A system comprising: a first illuminator generating a first light; a second illuminator generating a second light; a first collimator receiving the first light and collimating the first light to a first collimated light directed along a first axis; a second collimator receiving the second light and collimating the second light to a second collimated light directed along a second axis; a first light steering optical element for receiving the first collimated light along the first axis, the first light steering optical element directing the first collimated light to propagate along a third axis; and a second light steering optical element for receiving the second collimated light along the second axis, the second light steering optical element directing the second collimated light to propagate along a fourth axis, wherein the third axis and the fourth axis are diverging axes.

Clause B: The system of clause A, wherein a first included angle (Y1) between the first axis and the third axis is an obtuse angle, wherein a second included angle (Y2) between the second axis and the fourth axis is an obtuse angle.

Clause C: The system of clause A, wherein a first included angle (Y1) between the first axis and the third axis is within a range of 165 degrees and 175 degrees, wherein a second included angle (Y2) between the second axis and the fourth axis is within the range of 165 degrees and 175 degrees.

Clause D: The system of clause A, wherein a first included angle (Y1) between the first axis and the third axis is within a range of 169 degrees and 171 degrees, wherein a second included angle (Y2) between the second axis and the fourth axis is within the range of 169 degrees and 171 degrees.

Clause E: The system of clause A, wherein a first included angle (Y1) between the first axis and the third axis is 170 degrees, wherein a second included angle (Y2) between the second axis and the fourth axis is 170 degrees.

Based on the foregoing, it should be appreciated that concepts and technologies have been disclosed herein that provide an enhanced illumination system. Although the subject matter presented herein has been described in language specific to some structural features, methodological and transformative acts, and specific machinery or use of machinery, it is to be understood that the invention defined in the appended claims is not necessarily limited to the specific features or acts described herein. Rather, the specific features and acts are disclosed as example forms of implementing the claims.

The subject matter described above is provided by way of illustration only and should not be construed as limiting. Various modifications and changes may be made to the subject matter described herein without following the example configurations and applications illustrated and described, and without departing from the true spirit and scope of the present invention, which is set forth in the following claims.

What is claimed is:

1. A system comprising:
   a first illuminator generating a first light;
   a second illuminator generating a second light;
   a first collimator receiving the first light and collimating the first light to a first collimated light directed along a first axis;
   a second collimator receiving the second light and collimating the second light to a second collimated light directed along a second axis;
   a first light steering optical element for receiving the first collimated light along the first axis, the first light steering optical element directing the first collimated light to propagate along a third axis;
   a second light steering optical element for receiving the second collimated light along the second axis, the second light steering optical element directing the second collimated light to propagate along a fourth axis; and
   a visor positioned to allow the first light and the second light to pass through the visor, wherein the visor has a radius of curvature, wherein the first light enters a surface of the visor propagating along the third axis and the second light enters the surface of the visor propagating along the fourth axis, wherein the third axis and the fourth axis are diverging at a predetermined angle that is based on the radius of curvature.

2. The system of claim 1, wherein a first included angle (Y1) between the first axis and the third axis is an obtuse angle, wherein a second included angle (Y2) between the second axis and the fourth axis is an obtuse angle.

3. The system of claim 1, wherein a first included angle (Y1) between the first axis and the third axis is within a range of 140 degrees and 180 degrees, wherein a second included angle (Y2) between the second axis and the fourth axis is within the range of 140 degrees and 180 degrees.

4. The system of claim 1, further comprising a camera, wherein an optical axis relative to the camera is tilted at a predetermined tilt angle (N) relative to a horizontal plane.

5. The system of claim 4, wherein the predetermined tilt angle (N) is within a range of −40 degrees to 40 degrees.

6. The system of claim 1, wherein the first axis and the second axis define a first plane, and wherein the third axis and the fourth axis define a second plane, wherein a first included angle (Y1) between the first axis and the third axis is an obtuse angle, wherein a second included angle (Y2) between the second axis and the fourth axis is an obtuse angle, wherein a third included angle (Z) between the first plane and the second plane is an obtuse angle.

7. The system of claim 1, wherein the first axis and the second axis define a first plane, and wherein the third axis and the fourth axis define a second plane, wherein a first included angle (Y1) between the first axis and the third axis is within a range of 165 degrees and 175 degrees, wherein a second included angle (Y2) between the second axis and the fourth axis is within a range of 165 degrees and 175 degrees, wherein a third included angle (Z) between the first plane and the second plane is within a range of 132 and 152 degrees.

8. The system of claim 1, wherein the first axis and the second axis define a first plane, and wherein the third axis and the fourth axis define a second plane, wherein a first included angle (Y1) between the first axis and the third axis is within a range of 169 degrees and 171 degrees, wherein a second included angle (Y2) between the second axis and the fourth axis is within a range of 169 degrees and 171 degrees, wherein a third included angle (Z) between the first plane and the second plane is within a range of 141 and 143 degrees.

9. The system of claim 1, wherein the first axis and the second axis define a first plane, and wherein the third axis and the fourth axis define a second plane, wherein a first included angle (Y1) between the first axis and the third axis is 170 degrees, wherein a second included angle (Y2) between the second axis and the fourth axis is 170 degrees, wherein a third included angle (Z) between the first plane and the second plane is 142 degrees.

10. The system of claim 1, further comprising:
    a first diffuser configured to receive the first collimated light along the third axis, the first diffuser producing a first field of illumination from the first collimated light, the first field of illumination spreading light at a predetermined angle; and
    a second diffuser configured to receive the second collimated light along the fourth axis, the second diffuser producing a second field of illumination from the second collimated light, the second field of illumination spreading light at the predetermined angle.

11. The system of claim 10, wherein the predetermined angle is within the range of 90 degrees to 110 degrees.

12. The system of claim 10, wherein the predetermined angle is within the range of 99 degrees to 101 degrees.

13. A system, comprising:
    at least one illuminator emitting a first light along a first axis and a second light along a second axis;
    a first diffuser configured to receive the first light along the first axis, the first diffuser producing a first field of illumination from the first light along the first axis, the first field of illumination diffusing the light at a first predetermined angle (X);
    a second diffuser configured to receive the second light along the second axis, the second diffuser producing a second field of illumination from the second light along the second axis, the second field of illumination diffusing the light at the first predetermined angle (X); and
    a visor positioned to allow the first light and the second light to pass through the visor, wherein the visor has a radius of curvature, wherein the first light enters a surface of the visor propagating along the first axis and the second light enters the surface of the visor propagating along the second axis, wherein the first axis and the second axis are diverging at a second predetermined angle that is based on the radius of curvature.

14. The system of claim 13, wherein the first axis is diverging from a normal by a third predetermined angle (T1) and the second axis is diverging from the normal by a fourth predetermined angle (T2).

15. The system of claim 14, wherein the third predetermined angle (T1) is within a range of 0 to 40 degrees, and wherein the fourth predetermined angle (T2) is within a range of 0 to 40 degrees.

16. The system of claim 13, wherein the first axis and the second axis are tilted from a horizontal plane by a predetermined tilt angle (A).

17. The system of claim 16, wherein the predetermined tilt angle (A) is within a range of −40 degrees to 40 degrees relative to the horizontal plane.

18. The system of claim 13, further comprising a camera, wherein an optical axis through the center of, and normal to, a lens of the camera is tilted at a predetermined tilt angle (N) relative to a horizontal plane.

19. The system of claim 18, wherein the predetermined tilt angle (N) is within a range of −40 degrees to 40 degrees.

20. The system of claim 13, wherein the first predetermined angle (X) is within the range of 90 degrees to 110 degrees.

21. A method of producing an illumination system, the method comprising:
providing at least one illuminator configured to emit light;
arranging a first collimator to receive the light, the first collimator configured to collimate the light, the first collimator configured to produce a first collimated light directed along a first axis;
arranging a second collimator to receive the light, the second collimator configured to collimate the light, the second collimator configured to produce a second collimated light directed along a second axis;
arranging a first light steering optical element to receive the first collimated light, the first light steering optical element configured to direct the first collimated light to propagate along a third axis;
arranging a second light steering optical element to receive the second collimated light, the second light steering optical element configured to direct the second collimated light to propagate along a fourth axis; and
arranging a visor positioned to allow the first collimated light and the second collimated light to pass through the visor, wherein the visor has a radius of curvature, wherein the first light enters a surface of the visor propagating along the third axis and the second light enters the surface of the visor propagating along the fourth axis, wherein the third axis and the fourth axis are diverging at a predetermined angle that is based on the radius of curvature, wherein the predetermined angle that is based on the radius of curvature mitigates optical loss of the first collimated light and the second collimated light that passes through the visor.

22. The method of claim 21, further comprising:
adjusting a first included angle (Y1) between the first axis and the third axis based, at least in part, on a radius of curvature of a visor and a distance between the first axis and the second axis; and
adjusting a second included angle (Y2) between the second axis and the fourth axis based, at least in part, on the radius of curvature of the visor.

23. The method of claim 21, further comprising, wherein the first axis and the second axis define a first plane, and wherein the third axis and the fourth axis define a second plane, wherein the method further comprises adjusting a third included angle (Z) between the first plane and the second plane based, at least in part, on a radius of curvature of a visor.

24. The method of claim 21, further comprising:
adjusting a first included angle (Y1) between the first axis and the third axis based on a distance between the first axis and the second axis; and
adjusting a second included angle (Y2) between the second axis and the fourth axis based on the distance between the first axis and the second axis.

25. The method of claim 21, further comprising, wherein the first axis and the second axis define a first plane, and wherein the third axis and the fourth axis define a second plane, wherein the method further comprises adjusting a third included angle (Z) between the first plane and the second plane based, at least in part, on a distance between the first axis and the second axis.

26. The method of claim 21, further comprising,
arranging a first diffuser to receive the first collimated light along the third axis, the first diffuser configured to produce a first field of illumination from the first collimated light; and
arranging a second diffuser to receive the second collimated light along the fourth axis, the second diffuser configured to produce a second field of illumination from the second collimated light.

* * * * *